(12) United States Patent
Horigome et al.

(10) Patent No.: US 11,679,541 B2
(45) Date of Patent: *Jun. 20, 2023

(54) INJECTION BLOW MOLDING APPARATUS (71) Applicant: NISSEI ASB MACHINE CO., LTD., Nagano (JP)

(72) Inventors: Hiroshi Horigome, Nagano (JP); Shou Takato, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,405

(22) Filed: Jan. 3, 2022

(65) Prior Publication Data

US 2022/0219370 A1 Jul. 14, 2022

Related U.S. Application Data (63) Continuation of application No. 16/785,276, filed on Feb. 7, 2020, now Pat. No. 11,230,047, which is a
(Continued)

(30) Foreign Application Priority Data

Oct. 24, 2014 (JP) .................................. 2014-217642

(51) Int. Cl.
*B29C 49/06* (2006.01)
*B29C 49/56* (2006.01)
(Continued)

(52) U.S. Cl.
CPC .............. *B29C 49/06* (2013.01); *B29C 45/56* (2013.01); *B29C 45/67* (2013.01);
(Continued)

(58) Field of Classification Search
CPC ................ B29C 49/4236; B29C 49/56; B29C 2049/023; B29C 45/67; B29C 49/061
See application file for complete search history.

(56) References Cited

U.S. PATENT DOCUMENTS 3,784,348 A   1/1974   Aoki
3,850,562 A   11/1974  Takeuchi et al.
(Continued)

FOREIGN PATENT DOCUMENTS

CN    2759763     2/2006
CN    102712129   10/2012
(Continued)

OTHER PUBLICATIONS

Office Action issued from Korean Patent Application No. 10-2019-7008196 dated Nov. 5, 2020, and along with English Translation thereof.
(Continued)

*Primary Examiner* — Robert B Davis
(74) *Attorney, Agent, or Firm* — Greenblum & Bernstein, P.L.C.

(57) ABSTRACT

An injection blow molding apparatus comprises: a first oil supply section which has a hydraulic drive source composed of a drive motor, whose number of revolutions can be controlled, and a hydraulic pump and which supplies oil from an oil tank to an injection mold drive unit provided in an injection mold unit; and a second oil supply section which has a hydraulic drive source composed of a drive motor, whose number of revolutions can be controlled, and a hydraulic pump and which supplies oil from the oil tank to a blow mold drive unit provided in a blow mold unit, the second oil supply section being provided independently of the first oil supply section.

6 Claims, 5 Drawing Sheets

Related U.S. Application Data continuation of application No. 15/521,166, filed as application No. PCT/JP2015/080024 on Oct. 23, 2015, now Pat. No. 10,576,677.

(51) Int. Cl.
  *B29C 49/42* (2006.01)
  *B29C 45/67* (2006.01)
  *B29C 45/56* (2006.01)
  *B29C 49/78* (2006.01)

(52) U.S. Cl.
  CPC .......... *B29C 49/4236* (2013.01); *B29C 49/56* (2013.01); *B29C 49/78* (2013.01); *B29C 49/061* (2013.01)

(56) References Cited

U.S. PATENT DOCUMENTS

| | | |
|---|---|---|
| 4,946,367 A | 8/1990 | Nakamura |
| 6,341,953 B1 | 1/2002 | Okubo et al. |
| 7,704,065 B2 | 4/2010 | Hira et al. |
| 2002/0053204 A1 | 5/2002 | Kogane et al. |
| 2012/0294974 A1 | 11/2012 | Yokobayashi et al. |
| 2013/0313746 A1 | 11/2013 | Ikarashi et al. |

FOREIGN PATENT DOCUMENTS

| | | |
|---|---|---|
| JP | H02-38020 | 2/1990 |
| JP | H09-141415 | 6/1997 |
| JP | H10-230545 | 9/1998 |
| JP | 2000-218666 | 8/2000 |
| JP | 3455479 | 10/2003 |
| JP | 2006-123426 | 5/2006 |
| JP | 4319863 | 8/2009 |
| JP | 2009-297912 | 12/2009 |

OTHER PUBLICATIONS

Extended European search report issued in EP 19205669.5, dated Mar. 16, 2020.
International Search Report from the Japanese Patent Office for International Application No. PCT/JP2015/080024, dated Dec. 8, 2015.
Office Action issued by the Chinese Patent Office in corresponding Application No. 201580057500.1, dated Aug. 30, 2018.
Partial translation of CN 2759763 dated Feb. 2006 obtained from the e-space website. (Year: 2006).

INJECTION BLOW MOLDING APPARATUS

CROSS-REFERENCE TO RELATED PATENT APPLICATIONS

This application is a Continuation of U.S. patent application Ser. No. 16/785,276, filed Feb. 7, 2020, which is a Continuation of U.S. patent application Ser. No. 15/521,166, filed Apr. 21, 2017, now U.S. Pat. No. 10,576,677, issued on Mar. 3, 2020, which is a National Stage Entry of International Patent Application No. PCT/JP2015/080024, filed Oct. 23, 2015, which claims the benefit of Japanese Patent Application No. 2014-217642, filed Oct. 24, 2014. The disclosure of each of the applications listed above is incorporated by reference herein in its entirety.

TECHNICAL FIELD

This invention relates to an injection blow molding apparatus for producing a hollow container made of resin. Concretely, the invention relates to a one-stage injection blow molding apparatus improved in energy saving properties and low-noise properties.

BACKGROUND ART

Various methods for molding hollow containers composed of resin materials have been proposed so far. A typical method of them is an injection blow molding method which comprises forming a preform (parison) by injection molding, and blow molding this preform to form a hollow container.

An injection blow molding apparatus adopting this injection blow molding method has an injection molding section equipped with an injection device (injection unit) and an injection mold, and a blow molding section equipped with a blow molding machine and a blow mold. In the injection molding section, a resin material is injected by the injection device into the injection mold to form a preform. In the blow molding section, the preform accommodated in the blow mold is blow molded by the blow molding machine to form a hollow container. Such an injection blow molding apparatus is called, for example, a one-stage or hot parison injection blow molding apparatus.

The injection blow molding apparatus generally moves the injection mold and the blow mold by actuators composed of hydraulic cylinders or the like to carry out mold clamping. Each actuator is supplied with oil from an oil tank by a hydraulic drive source which has a plurality of, for example, 2 to 3 fixed pumps and one induction motor. In recent years, injection blow molding apparatuses have appeared which reduce energy consumption during molding, for example, by adopting a hydraulic drive source including one or two variable pumps, which have been changed from the two to three fixed pumps, and an induction motor combined therewith. However, a further improvement in the energy saving properties of the injection blow molding apparatus is desired.

To meet such a desire, a proposal has been made for an injection device (injection unit) constituting an injection molding apparatus, the injection device having, for example, a hydraulic drive source which includes a fixed discharge hydraulic pump and a drive motor (e.g., servo motor) for driving this hydraulic pump, and which controls the rotational speed of the drive motor to control the discharge flow rate and the discharge pressure of the hydraulic pump (see, for example, Patent Document 1).

PRIOR ART DOCUMENTS

Patent Documents

Patent Document 1: Japanese Patent No. 3455479

SUMMARY OF THE INVENTION

Problems to be Solved by the Invention

By adopting such an injection unit (injection device), the energy saving properties of an injection blow molding apparatus can be improved further.

The above-described pressure drive source is known to consume less energy than does a pressure drive source equipped with variable pumps and an induction motor. Thus, it is conceivable to also employ the aforementioned pressure drive source having hydraulic pumps and a drive motor, as an oil supply section for supplying oil to each of actuators constituting devices other than an injection device of an injection blow molding apparatus.

The injection blow molding apparatus, however, often has a large number of actuators to be operated, and involves complicated hydraulic circuits. To improve the energy saving properties of the injection blow molding apparatus, therefore, it is not sufficient for the injection blow molding apparatus to have a single oil supply section (pressure drive source) as in the case of a single injection unit (injection device). Instead, the injection blow molding apparatus needs to have a plurality of oil supply sections (pressure drive sources).

The present invention has been accomplished in the light of the foregoing circumstances. It is an object of the invention to provide an injection blow molding apparatus aimed at improving energy saving properties by appropriately providing a plurality of oil supply sections.

Means for Solving the Problems

A first aspect of the present invention, intended to solve the above problems, is an injection blow molding apparatus including an injection molding section which is equipped with an injection unit and an injection mold unit to be operated by an oil pressure and which forms a preform by injection molding, and a blow molding section which is equipped with a blow mold unit to be operated by an oil pressure and which blow molds the preform, the injection blow molding apparatus comprising: a first oil supply section which has a hydraulic drive source composed of a drive motor, whose number of revolutions can be controlled, and a hydraulic pump and which supplies oil from an oil tank to an injection mold drive unit provided in the injection mold unit; and a second oil supply section which has a hydraulic drive source composed of a drive motor, whose number of revolutions can be controlled, and a hydraulic pump and which supplies oil from the oil tank to a blow mold drive unit provided in the blow mold unit, the second oil supply section being provided independently of the first oil supply section.

A second aspect of the present invention is the injection blow molding apparatus according to the first aspect, further comprising: a third oil supply section which has a hydraulic drive source composed of a drive motor, whose number of revolutions can be controlled, and a hydraulic pump and which supplies oil from the oil tank to an injection drive unit provided in the injection unit, wherein the first oil supply section and the second oil supply section are provided independently of the third oil supply section.

A third aspect of the present invention is the injection blow molding apparatus according to the first or second aspect, wherein the drive motor is a servo motor.

A fourth aspect of the present invention is the injection blow molding apparatus according to any one of the first to third aspects, wherein the injection mold unit comprises an injection mold including a neck mold for forming a neck portion of the preform, an injection core mold for forming the inner shape of the preform, and an injection cavity mold for forming the outer shape of a barrel portion of the preform; the injection mold drive unit includes an opening/closing drive portion for opening and closing the injection mold, a raising/lowering drive portion for raising and lowering the neck mold with respect to the injection cavity mold, and a mold clamping drive portion for clamping the injection mold which has been closed; and the first oil supply section supplies oil from the oil tank to the opening/closing drive portion, the raising/lowering drive portion, and the mold clamping drive portion.

Effects of the Invention

According to the present invention described above, the plurality of oil supply sections each having the pressure drive source composed of the oil pump and the drive motor are appropriately provided for the plurality of drive units. Thus, the blow molding apparatus improved in energy saving properties can be realized. Furthermore, noises during operation of the injection blow molding apparatus can be reduced. That is, the low-noise properties of the injection blow molding apparatus can also be improved.

MODE FOR CARRYING OUT THE INVENTION

An embodiment of the present invention will now be described in detail by reference to the accompanying drawings.

Figure 1:
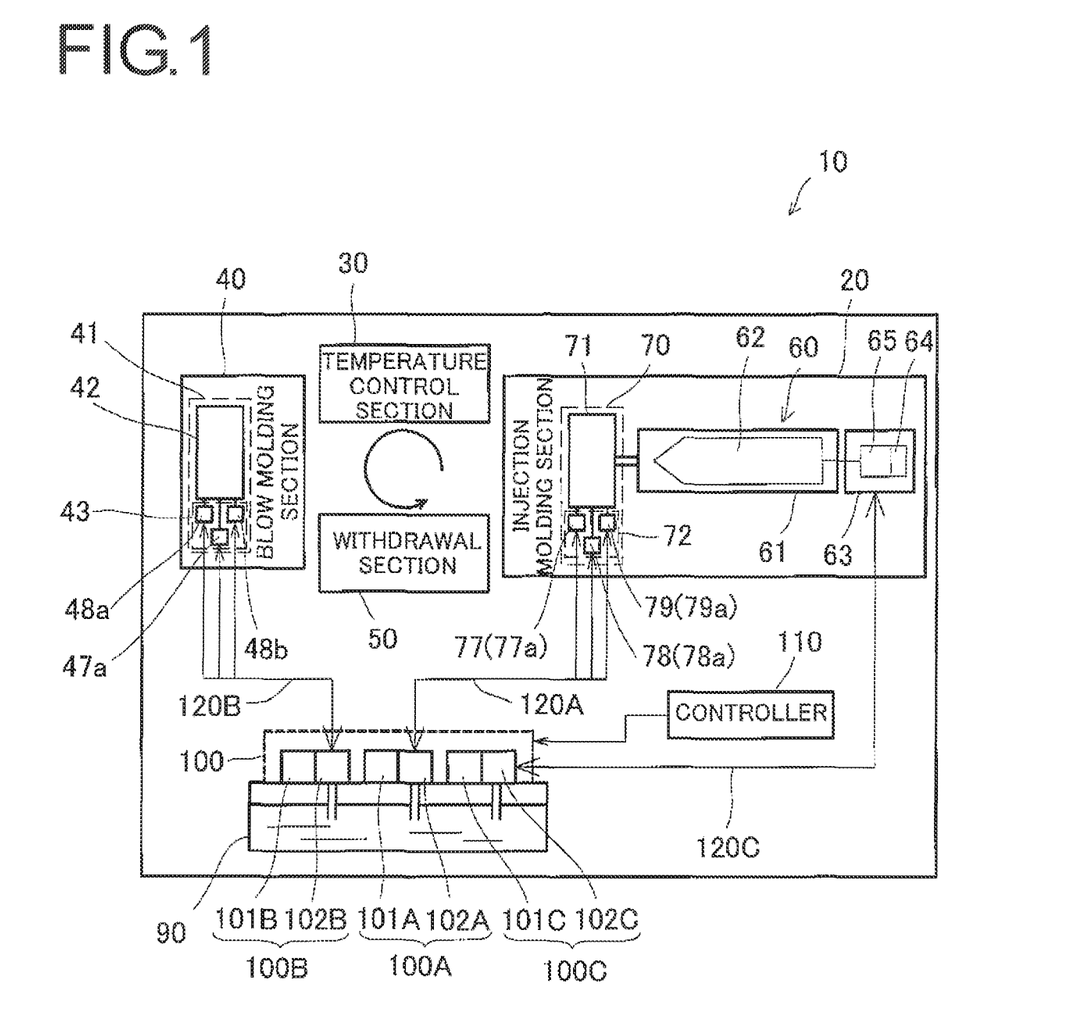
FIG. 1 is a block diagram showing the schematic configuration of an injection blow molding apparatus according to an embodiment of the present invention.

An injection blow molding apparatus 10 according to the present embodiment shown in FIG. 1 is a so-called one-stage apparatus, and comprises an injection molding section 20 for injection molding a preform (not shown), a temperature control section 30 for performing the temperature control of the preform, a blow molding section 40 for blow molding the preform to form a hollow container which is a final molded product, and a withdrawal section 50 for taking the hollow container out of the apparatus.

The injection molding section 20 is composed of an injection device 60 for injecting a resin material, and an injection mold unit 70 including an injection mold 71 installed to be adjacent to the injection device 60.

The injection device 60 incorporates an injection screw 62 in an injection cylinder 61, and has an injection drive unit 63 for rotating and advancing the injection screw 62. The injection drive unit 63 is composed of an injecting hydraulic motor 64 and an injecting hydraulic cylinder 65 which serve as actuators. The injection device 60 is designed to carry out injection by retreating the injection screw 62 while rotating it by the injecting hydraulic motor 64 to charge a predetermined amount of the resin material ahead of the injection screw 62 and, after completion of the charging, advancing the injection screw 62 by the injecting hydraulic cylinder 65.

Figure 2:
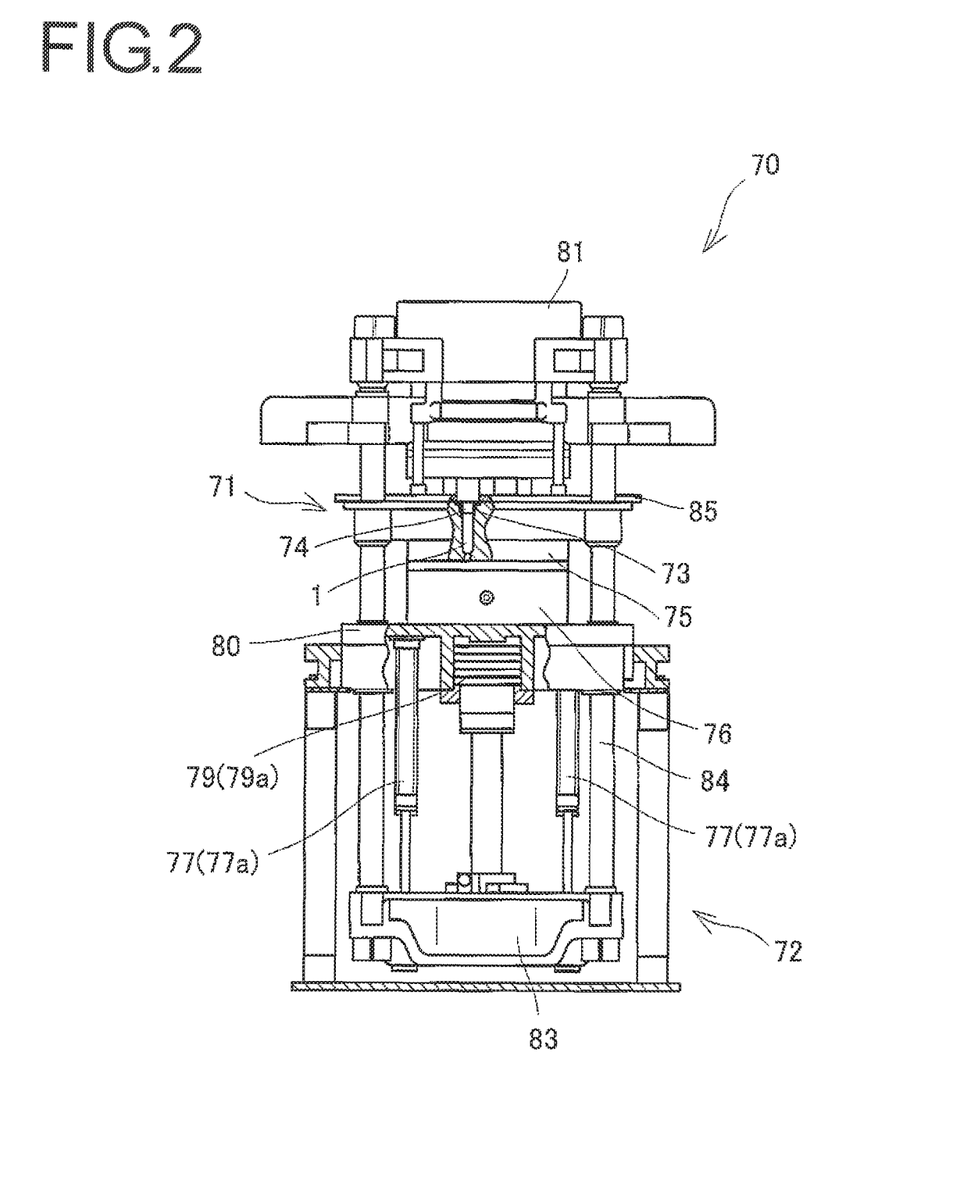
FIG. 2 is a front view showing the schematic configuration of an injection mold unit according to the embodiment of the present invention.
Figure 3:
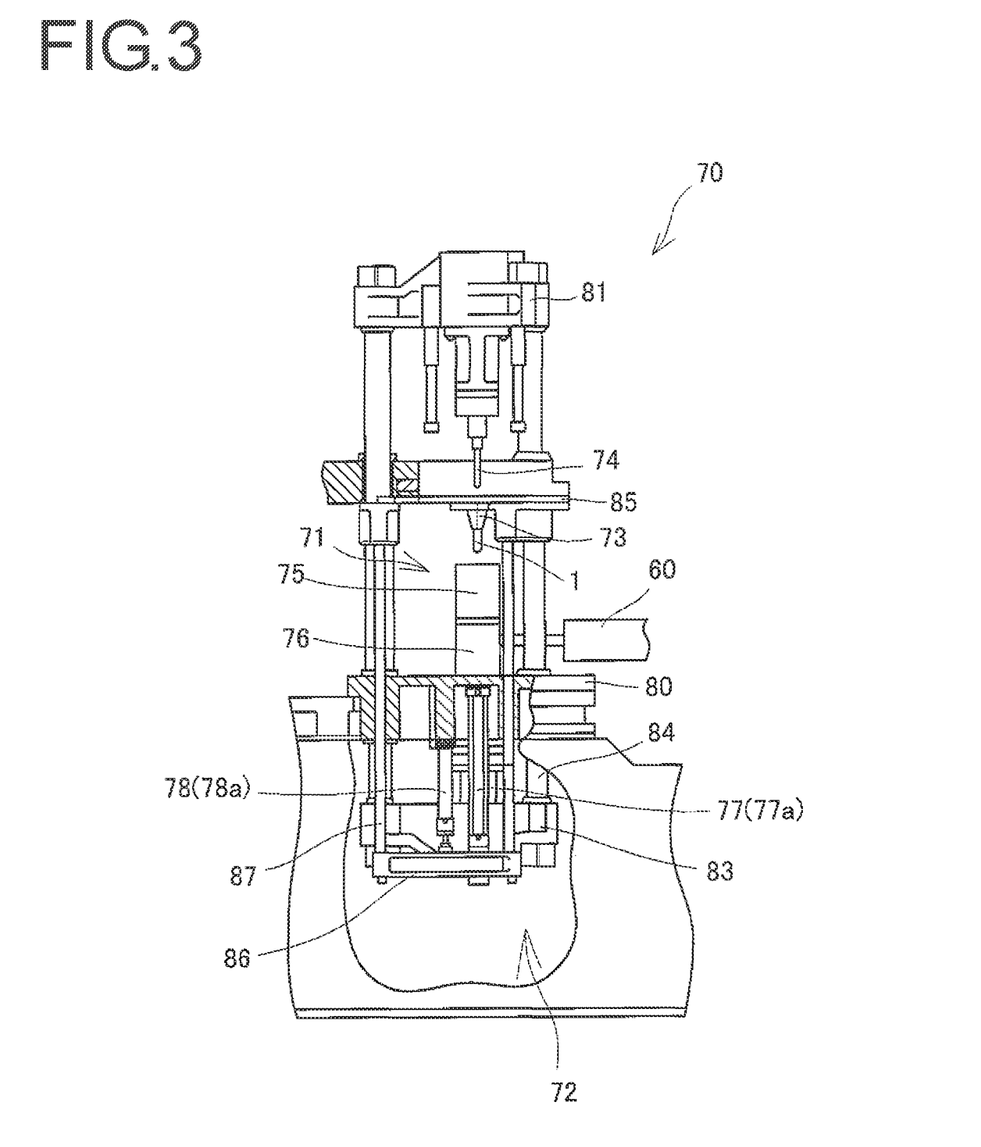
FIG. 3 is a side view showing the schematic configuration of the injection mold unit according to the embodiment of the present invention.
Figure 4:
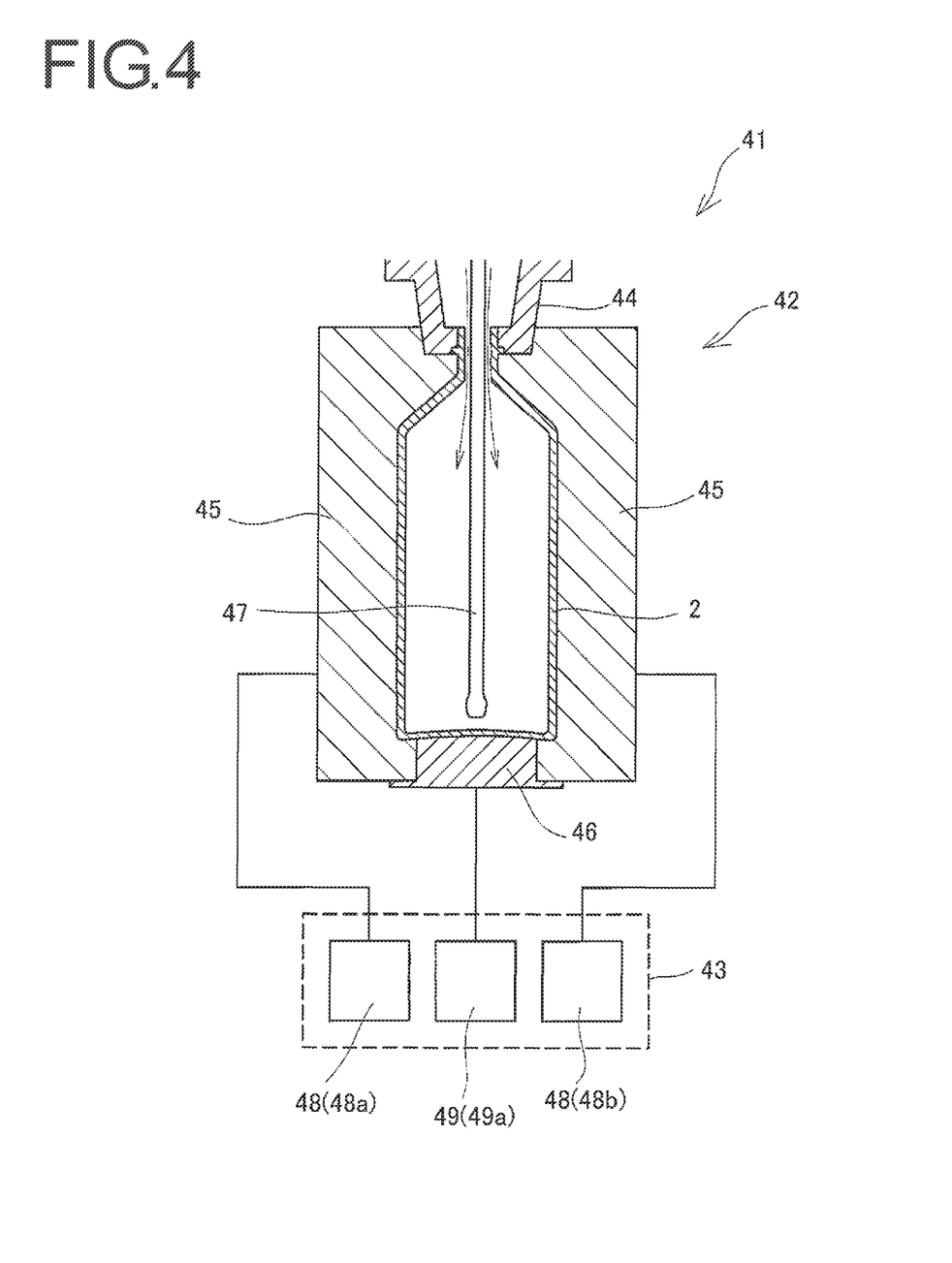
FIG. 4 is a view showing the schematic configuration of a blow mold according zo the embodiment of the present invention.

The injection mold unit 70 is equipped with the injection mold 71, and an injection mold drive unit 72. As shown in FIGS. 2 and 3, the injection mold 71 includes a neck mold 73 for forming a neck portion of a preform 1, an injection core mold 74 for forming the inner shape of the preform 1, an injection cavity mold 75 for forming the outer shape of a barrel portion of the preform 1, and a hot-runner mold 76 for distributing and guiding molten resin, which has been supplied from the injection device 60, into the injection cavity mold 75 that has been clamped.

The injection mold drive unit 72 has an opening/closing drive portion (high speed opening/closing mechanism) 77 for opening and closing the injection core mold 74 constituting the injection mold 71 at a high speed; a raising/lowering drive portion (raising/lowering mechanism) 78 for raising and lowering the neck mold 73 with respect to the injection cavity mold 75; and a mold clamping drive portion (high pressure mold clamping mechanism) 79 for clamping the closed injection mold 71 at a high pressure.

The opening/closing drive portion 77 has actuators 77a composed of hydraulic cylinders to be driven by an oil pressure, and opens and closes the injection mold 71 by use of the actuators 71a as a power source. For example, the opening/closing drive portion 77 lowers and raises the injection core mold 74, with the use of the actuators 77a fixed inside a machine stand 80 as a power source, thereby closing and opening the injection mold 71. In detail, the actuators 77a lower and raise an upper movable platen 81, to which the injection core mold 74 has been fixed, via a lower moving plate 83 and tie bars 84 with respect to the injection cavity mold 75 and the hot-runner mold 76 installed on the machine stand 80.

The raising/lowering drive portion 78 has an actuator 78a, such as a hydraulic cylinder fixed inside the machine stand 80 and driven by an oil pressure, and raises and lowers the neck mold 73 with respect to the injection cavity mold 75 by use of the actuator 78a as a power source. In detail, the actuator 78a allows a neck mold moving plate 85, to which the neck mold 73 has been fixed, to make an ascending or descending motion via a neck mold raising/lowering plate 86 and tie bars 81. The mold clamping drive portion 79 has an actuator 79a composed of a hydraulic cylinder or the like fixed inside the machine stand 30 and driven by an oil pressure, and clamps the closed injection mold 71 at a high pressure by use of the actuator 79a as a power source.

The opening/closing drive portion 77, the raising/lowering drive portion 78, and the mold clamping drive portion 79 have mechanisms of existing configurations, and thus their detailed explanations are omitted herein (if they are necessary, reference is requested to the official gazette of a prior application by the present applicant (e.g., Japanese Patent. No. 4319863)).

The blow molding section 40 is equipped with a blow mold unit 41 including a blow mold 42 for blow molding the preform, and a blow mold drive unit 43. The blow mold 42, as shown in FIG. 3, is composed of a neck mold 44 for holding a neck of a hollow container 2, a pair of openable and closable blow split molds 45 for forming the outer shape of a barrel of the hollow container 2, and a blow bottom mold 46 for forming the bottom shape of the hollow container.

In the blow molding section 40, such a blow mold 42 is opened, closed and clamped by the blow mold drive unit 43, and a stretching rod 47 and high pressure air are introduced into the preform disposed inside to perform biaxial stretch blow molding of the preform, thereby forming the hollow container 2.

The blow mold drive unit 43 has an opening/closing drive portion 48 for mold opening, closing and clamping the pair of blow split molds 45, and a raising/lowering drive portion 49 for raising and lowering the blow bottom mold 46. Concretely, the opening/closing drive portion 48 has actuators 48*a*, 48*b* constituted by hydraulic cylinders or the like to be driven by an oil pressure, and these actuators 48*a*, 48*b* are connected to the paired blow split molds 45. The raising/lowering drive portion 49 has an actuator 49*a* constituted by a hydraulic cylinder or the like to be driven by an oil pressure, and this actuator 49*a* is connected to the blow bottom mold 46.

The blow mold drive unit 43 (actuators 48*a*, 48*b*, 49*a*), the injection mold drive unit 72 (actuators 77*a*, 78*a*, 79*a*), and the injection drive unit 63 (injecting hydraulic motor 64 and injecting hydraulic cylinder 65) are actuated when supplied with oil from an oil tank 90.

The injection blow molding apparatus 10 according to the present invention is equipped with a plurality of oil supply sections 100 for supplying oil (working fluid) within the oil tank 90 to the blow mold drive unit 43, the injection mold drive unit 72, and the injection drive unit 63. In the present embodiment, the injection blow molding apparatus 10 has 3 of the oil supply sections 100 (first to third oil supply sections 100A, 100B, 100C) (see FIG. 1).

Each of the first to third oil supply sections 100A, 100B and 100C is provided with a hydraulic drive source composed of a drive motor 101 (101A, 101B, 101C) whose number of revolutions can be controlled, and a hydraulic pump 102 (102A, 102B, 102C), and adjusts the flow rate of oil (discharge flow rate) and the pressure of oil (discharge pressure), the oil discharged from the hydraulic pump 102, based on the number of revolutions and the torque of the drive motor 101 controlled by a controller 110. The drive motor 101 may be a motor having the number of revolutions controllable and, a servo motor or an inverter motor, for example, is used suitably. In the present embodiment, a servo motor with higher responsiveness than other motors is adopted as the drive motor 101. A fixed discharge type hydraulic pump is employed as the hydraulic pump 102. That is, in the present embodiment, each of the first to third oil supply sections 100A, 100B, 100C has a so-called servo pump as a hydraulic drive source. In consideration of a reduction in the initial cost of the apparatus, moreover, use is made of the three hydraulic drive sources (servo pumps) constituting the oil supply sections 100A, 100B, 100C which exhibit the same performance.

In the present embodiment, the first oil supply section 100A is connected to the injection mold drive unit 72 (actuators 77*a*, 78*a*, 79*a*) provided in the injection mold unit 70 via a hydraulic circuit 120A. In the hydraulic circuit 120A, a pressure control valve, a flow control valve, a direction control valve, etc. are arranged, as appropriate, although their illustrations are omitted. By controlling these control valves, as appropriate, oil is suplied from the first oil supply section 100A to the respective actuators 77*a*, 78*a*, 79*a*.

The second oil supply section 100B is provided independently of the first oil supply section 100A, and is connected to the blow mold drive unit 43 (actuators 48*a*, 48*b*, 49*a*) provided in the blow mold unit 41 via a hydraulic circuit 120B. Further, the third oil supply section 100C is provided independently of the first oil supply section 100A and the second oil supply section 100B, and is connected to the injection drive unit 63 (injecting hydraulic motor 64 and injecting hydraulic cylinder 65) of the injection device 60 via a hydraulic circuit 120C.

The injection blow molding apparatus 10 according to the present invention has the plurality of oil supply sections 100A, 100B, 100C which are independent of each other and which have the hydraulic drive sources composed of the drive motors 101, such as servo motors or inverter motors, and the hydraulic pumps 102. That is, the first to third oil supply sections 100A, 100B and 100C can be controlled independently. Also, the first to third oil supply sections 100A, 100B and 100C supply oil to the different drive units 43, 72, 63 to actuate their respective actuators. By so doing, the number of revolutions of the drive motors 101A, 101B, 101C constituting the first to third oil supply sections 100A, 100B and 100C can be individually decreased in accordance with the required loads of the drive units 43, 72, 63. Thus, the energy saving properties of the injection blow molding apparatus 10 can be improved.

With the conventional injection blow molding apparatus, on the other hand, the hydraulic pumps for the blow mold drive unit, the injection mold drive unit, and the injection device are driven by one induction motor. Thus, even when it is attempted to simply decrease the amount of the hydraulic oil in the injection mold drive unit, for example, the discharge amount is unchanged (in the case of the fixed pump), because the number of revolutions of the induction motor is constant. Hence, it is necessary to drive, as appropriate, the various control valves arranged in the hydraulic circuit, thereby adjusting the flow rates. This also influences the hydraulic circuits for the blow mold drive unit and the injection device. As a result, the amount of the pressure oil discarded without being used in each actuator is also increased, thus generally resulting in a low energy efficiency.

With the injection blow molding apparatus 10 according to the present invention, moreover, each of the oil supply sections 100A, 100B, 100C has the hydraulic drive source composed of the drive motor 101, such as a servo motor or an inverter motor, and the hydraulic pump 102, as mentioned above. According to this configuration, the number of revolutions of each of the drive motors 101A, 101B, 101C can be decreased appropriately and individually when the required loads of the drive units 43, 72, 63 are low. Hence, noises during operation of the apparatus can be reduced. That is, the low-noise properties of the injection blow molding apparatus 10 can be improved.

The oil supply sections 100A, 100B, 100C are configured to be independent of, and not to be dependent on, each other. Thus, they can individually control the oil pressures (adjust the hydraulic pressure waveforms) of the respective hydraulic drive units including the blow mold drive unit 43, injection mold drive unit 72, and injection device 63. If there is any problem, or point to be improved, in the operating behavior or operating time of any of the hydraulic drive units, therefore, it is sufficient to adjust the hydraulic pressure waveform or the like of only the hydraulic drive unit at issue, thus facilitating a measure for solving the problem. Consequently, the operating trouble of the injection blow molding apparatus 10 as a whole is also easy to eliminate as compared with the conventional injection blow molding apparatus. Furthermore, the operating time of the entire injection blow molding apparatus 10 can be shortened, and its energy saving properties can be improved, in comparison with the conventional injection blow molding apparatus.

Besides, the work efficiency of molding adjustment, etc. is increased. Since the first to third oil supply sections 100A, 100B, 100C are independent of each other, it is possible to exercise control over the respective oil supply sections; for example, it is possible to adjust the oil pressure-related parameters, such as gain, response speed, and command pressure, individually and optimally. Hence, the pressure of oil (oil pressure, hydraulic pressure) supplied to each actuator can be adjusted more appropriately.

Figure 5A:
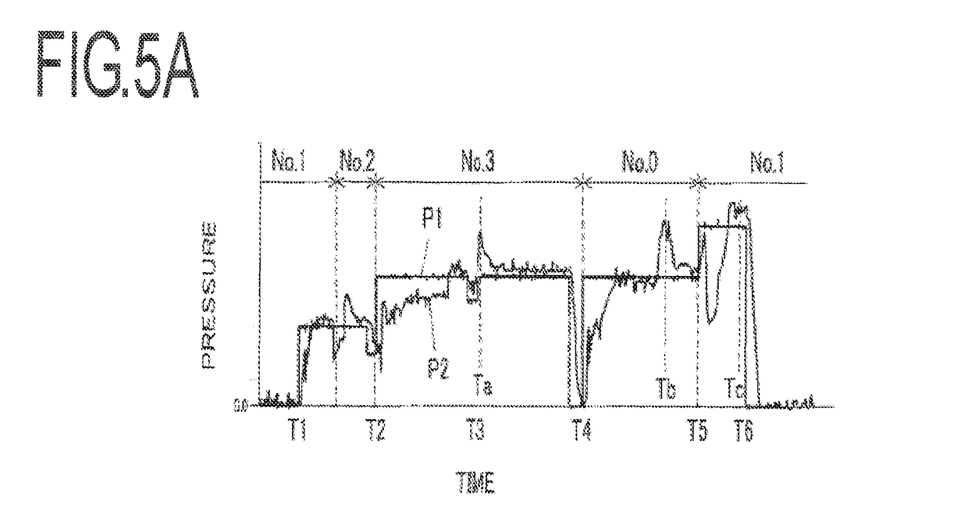
FIGS. 5A, 5B are hydraulic pressure waveform charts showing changes over time in a command pressure and an actual pressure in an injection molding step.
Figure 5B:
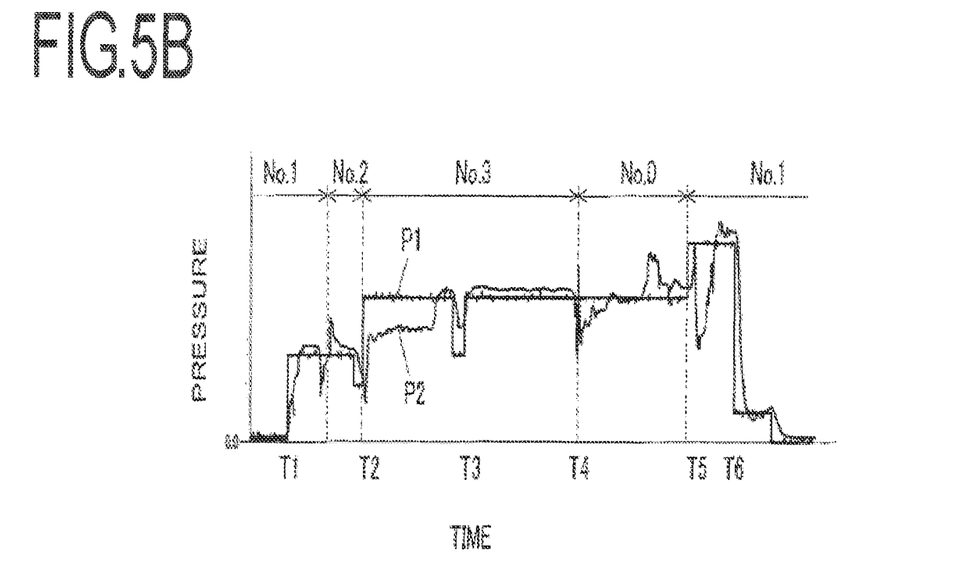

FIGS. 5A, 5B are time-varying hydraulic pressure waveform charts showing changes in a command pressure P1 required of the first oil supply section 100A in the injection molding step, and changes in an actual pressure P2 given by the first oil supply section 100A based on the command pressure P1, FIG. 5A showing the state before adjustment, and FIG. 5B showing the state after adjustment. The actual pressure P2 is the sum of the values detected by oil pressure gauges (not shown) provided near the actuators 77a, 78a, 79a in the hydraulic circuit 120A.

The hydraulic pressure waveform charts in FIGS. 5A, 5B show the command pressure P1 and the actual pressure P2 during a cycle of the injection molding step, starting from a state in which the injection mold 71 has been clamped. First, during the period from a time T1 to a time T2, the actuator 79a is actuated (retreated) to complete the clamping of the injection mold 71. During the period from the time T2 to a time T3, the actuators 77a, 78a are actuated (retreated) to carry out the opening of the injection mold 71. Then, during the period from the time T3 to a time T4, transport of the injection-molded preform is performed. During the period from the time T4 to a time T5, the actuators 77a, 78a are operated (advanced) to close the injection mold 71 again. During the period from the time T5 to a time T6, the actuator 79a is operated (advanced) to perform the clamping of the injection mold 71.

Such a series of actions of the injection mold drive unit 72 (actuators 77a, 78a, 79a) is controlled by the first oil supply section 100A (drive motor 101A), as stated earlier. The first oil supply section 100A controls only the actions of the injection mold drive unit 72. Thus, the discharge pressure and the discharge amount, etc. by the first oil supply section 100A can be adjusted more appropriately in conformity with the actions of the injection mold drive unit 72.

Concretely, the first oil supply section 100A is capable of adjustment of the command pressure, etc. through a plurality of (e.g., four) channels. Since the first oil supply section 100A controls only the actions of the injection mold drive unit 72 as mentioned above, it can assign all of the four channels for the injection mold drive unit 72. Hence, the control over the discharge pressure, etc. by the first oil supply section 100A can be adjusted more appropriately in conformity with the actions of the injection mold drive unit 72.

For example, the first oil supply section 100A (drive motor 101A) is controlled to provide the command pressure P1, but the actual pressure P2 may deviate from the command pressure P1 because of the occurrence of a surge pressure. In the example shown in FIG. 5A, a surge pressure occurs, for example, at the time Ta, the time Tb, and the time Tc, with the result that the actual pressure P2 deviates from the command pressure P1. Even in such a case, settings are made such that the time Ta, the time Tb, and the time Tc when these surge pressures occur belong to different channels. By so doing, the surge pressures occurring at a plurality of timings can be reduced appropriately.

In the examples of FIGS. 5A, 5B, one cycle of the injection molding step is assigned to the four channels, Channel Nos. 0 to 3. The period including the time Ta is assigned to Channel No. 3, the period including the time Tb is assigned to Channel No. 0, and the period including the time Tc is assigned to Channel No. 1.

In Channel No. 3, therefore, control of the first oil supply section 100A can be adjusted in accordance with the magnitude of the surge pressure at the time Ta. In Channel No. 0, control of the first oil supply section 100A can be adjusted in accordance with the magnitude of the surge pressure at the time Tb. In Channel No. 1, control of the first oil supply section 100A can be adjusted in accordance with the magnitude of the surge pressure at the time Tc. By these measures, the surge pressures at the time Ta, time Tb and time Tc can be effectively suppressed, as shown in FIG. 5B. By adjusting and reducing such undesirable hydraulic pressure waveforms, the operating rate of the drive motor 101A can be decreased. As a result, the power consumption per cycle of molding can be reduced and, further, the operating time of the injection mold drive unit 72 can also be shortened.

How to assign the channels is not particularly limited, and may be determined, as appropriate, in accordance with the actual pressure P2 or the like.

The present invention has been described above in connection with its one embodiment, but it is to be understood that the invention is in no way limited to this embodiment. The present invention can be changed or modified, as appropriate, without departing from its spirit and scope.

EXPLANATIONS OF LETTERS OR NUMERALS

1 Preform
2 Hollow container
10 Injection blow molding apparatus
20 Injection molding section
30 Temperature control section
40 Blow molding section
41 Blow mold unit
42 Blow mold
43 Blow mold drive unit
43a Actuator
44 Neck mold
45 Blow split mold
46 Blow bottom mold
47 Stretching rod
48 Opening/closing drive portion
48a, 48b Actuator
49 Raising/lowering drive portion
49a Actuator
50 Withdrawal section
60 Injection device
61 Injection cylinder
62 Injection screw
63 Injection drive unit
64 Injecting hydraulic motor
65 Injecting hydraulic cylinder
70 Injection mold unit
71 Injection mold 72 Injection mold drive unit
73 Neck mold
74 Injection core mold
75 Injection cavity mold
76 Hot-runner mold
77 Opening/closing drive portion
77a Actuator
78 Raising/lowering drive portion
78a Actuator
79 Mold clamping drive portion
79a Actuator
90 Oil tank
100 Oil supply section
101 Drive motor (servo motor)
102 Hydraulic pump
110 Controller
120 Hydraulic circuit

What is claimed is:

1. An injection blow molding apparatus, comprising:
an injection molding section configured to form a preform by injection molding, the injection molding section including:
an injection unit; and
an injection mold unit configured to be operated by an oil pressure;
a blow molding section configured to blow mold the preform and including a blow mold unit;
a first oil supply section including a hydraulic drive source and configured to supply oil from an oil tank to an injection mold drive unit of the injection mold unit, the hydraulic drive source including: a drive motor, whose number of revolutions is configured to be controlled; and a hydraulic pump;
a third oil supply section including a hydraulic drive source and configured to supply oil from the oil tank to an injection drive unit of the injection unit, the hydraulic drive source including: a drive motor, whose number of revolutions is configured to be controlled; and a hydraulic pump;
and
a controller configured to control the number of revolutions of the drive motor of the first oil supply section,
wherein the injection mold drive unit includes at least an opening/closing drive portion for opening and closing the injection mold,
wherein the first oil supply section is configured to supply oil from the oil tank to the opening/closing drive portion,
wherein the third oil supply section is provided independently of the first oil supply section, and
wherein the controller, which is configured to control the number of revolutions of the drive motor of the first oil supply section, is configured to control the number of revolutions of the drive motor of the third oil supply section.

2. The injection blow molding apparatus according to claim 1, further comprising:
a second oil supply section including a hydraulic drive source and configured to supply oil from the oil tank to a blow mold drive unit of the blow mold unit, the hydraulic drive source including: a drive motor, whose number of revolutions is configured to be controlled; and a hydraulic pump,
wherein the second oil supply section is provided independently of the first oil supply section and the third oil supply section, and
wherein the controller, which is configured to control the number of revolutions of the drive motor of the first oil supply section and the number of revolutions of the drive motor of the third oil supply section, is configured to control the number of revolutions of the drive motor of the second oil supply section.

3. The injection blow molding apparatus according to claim 1,
wherein the drive motor is a servo motor.

4. The injection blow molding apparatus according to claim 3,
wherein the injection mold unit comprises an injection mold including:
a neck mold for forming a neck portion of the preform;
an injection core mold for forming an inner shape of the preform; and
an injection cavity mold for forming an outer shape of a barrel portion of the preform,
wherein the injection mold drive unit further includes:
a raising/lowering drive portion for raising and lowering the neck mold with respect to the injection cavity mold; and
a mold clamping drive portion for clamping the injection mold which has been closed, and
wherein the first oil supply section is further configured to supply oil from the oil tank to the raising/lowering drive portion and the mold clamping drive portion.

5. An injection blow molding apparatus, comprising:
an injection molding section configured to form a preform by injection molding, the injection molding section including:
an injection unit configured to be operated by an oil pressure; and
an injection mold unit configured to be operated by an oil pressure;
a blow molding section configured to blow mold the preform and including a blow mold unit;
a first oil supply section including a hydraulic drive source and configured to supply oil from an oil tank to an injection mold drive unit of the injection mold unit, the hydraulic drive source including: a drive motor, whose number of revolutions is configured to be controlled; and a hydraulic pump; and
a third oil supply section including a hydraulic drive source and configured to supply oil from the oil tank to an injection drive unit of the injection unit, the hydraulic drive source including: a drive motor, whose number of revolutions is configured to be controlled; and a hydraulic pump, the third oil supply section being provided independently of the first oil supply section.

6. The injection blow molding apparatus according to claim 5,
wherein the drive motor is a servo motor.

* * * * *